(12) United States Patent
Taniguchi et al.

(10) Patent No.: US 8,477,328 B2
(45) Date of Patent: Jul. 2, 2013

(54) FUNCTION-PROVIDING SYSTEM

(75) Inventors: Shinya Taniguchi, Matsumoto (JP);
Taro Ishige, Matsumoto (JP); Koki Go, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1156 days.

(21) Appl. No.: 12/238,002

(22) Filed: Sep. 25, 2008

(65) Prior Publication Data
US 2009/0083473 A1  Mar. 26, 2009

(30) Foreign Application Priority Data

Sep. 26, 2007  (JP) ................................ 2007-248972

(51) Int. Cl.
 *G06K 15/00* (2006.01)
 *G06F 9/45* (2006.01)
(52) U.S. Cl.
 USPC ......................................... 358/1.14; 717/146
(58) Field of Classification Search
 USPC ............................................ 358/1.14; 711/5
 See application file for complete search history.

(56) References Cited

U.S. PATENT DOCUMENTS

| 7,246,153 B2 | 7/2007 | Tsuchitoi |
| 7,593,983 B2 | 9/2009 | Machida |
| 2001/0052995 A1* | 12/2001 | Idehara .......................... 358/1.15 |
| 2006/0218541 A1* | 9/2006 | Saito .............................. 717/146 |
| 2007/0133033 A1* | 6/2007 | Mizutani et al. .............. 358/1.14 |

FOREIGN PATENT DOCUMENTS

| JP | 7-262141 A | 10/1995 |
| JP | 10-289078 A | 10/1998 |
| JP | 2000-315181 A | 11/2000 |
| JP | 2002-123150 A | 4/2002 |
| JP | 2002-196995 A | 7/2002 |
| JP | 2005-18232 A | 1/2005 |
| JP | 2005-316904 A | 11/2005 |
| JP | 2006-094049 A | 4/2006 |
| JP | 2006-268752 A | 10/2006 |

* cited by examiner

*Primary Examiner* — Houshang Safaipour
*Assistant Examiner* — Neil R McLean

(57) ABSTRACT

From among identical modules stored on a module storage 112 and a module storage 212, an authenticated printing management module 130 selects the module with higher level information. For example, an ID authentication module 132 is stored in both the module storage 112 of an MFP 10 and the module storage 212 of a network interface card 11. The authenticated printing management module 130 selects the ID authentication module of the network interface card 11, in accordance with level information that represents an ID authentication module selection hierarchy. By so doing, where modules necessary for executing authenticated printing are included on both the MFP 10 and the network interface card 11, modules present on either the MFP 10 or the network interface card 11 are able to be selected appropriately for use.

14 Claims, 10 Drawing Sheets

Fig.4A

MFP10    600

| | MODEL NAME | LEVEL |
|---|---|---|
| X | AUTHENTICATED PRINTING MANAGEMENT MODULE | 5 |
| | ID READING MODULE | 0 |
| X | ID AUTHENTICATION MODULE | 3 |
| X | PRINT DATA ACQUISITION MODULE | 3 |
| X | PRINT EXECUTION MODULE | 4 |
| X | COMPLETED PRINTING ALERT MODULE | 5 |

Fig.4B

NW CARD 11    610

| | MODEL NAME | LEVEL |
|---|---|---|
| X | AUTHENTICATED PRINTING MANAGEMENT MODULE | 1 |
| X | ID READING MODULE | 5 |
| X | ID AUTHENTICATION MODULE | 4 |
| X | PRINT DATA ACQUISITION MODULE | 3 |
| X | PRINT EXECUTION MODULE | 2 |
| X | COMPLETED PRINTING ALERT MODULE | 1 |

Fig.6A

MFP10 620

| | MODEL NAME | LOAD |
|---|---|---|
| X | AUTHENTICATED PRINTING MANAGEMENT MODULE | 1.0 |
| | ID READING MODULE | - |
| X | ID AUTHENTICATION MODULE | 1.0 |
| X | PRINT DATA ACQUISITION MODULE | 1.0 |
| X | PRINT EXECUTION MODULE | 1.0 |
| X | COMPLETED PRINTING ALERT MODULE | 2.0 |

Fig.6B

NW CARD 11 630

| | MODEL NAME | LOAD |
|---|---|---|
| X | AUTHENTICATED PRINTING MANAGEMENT MODULE | 0.0 |
| X | ID READING MODULE | 1.0 |
| X | ID AUTHENTICATION MODULE | 0.0 |
| X | PRINT DATA ACQUISITION MODULE | 0.0 |
| X | PRINT EXECUTION MODULE | 0.0 |
| X | COMPLETED PRINTING ALERT MODULE | 0.0 |

Fig.9A

| 001 | PROVIDING MODEL |
|---|---|
| AUTHENTICATED PRINTING MANAGEMENT MODULE | mfp001 |
| ID READING MODULE | nwcard001 |
| ID AUTHENTICATION MODULE | nwcard001 |
| PRINT DATA ACQUISITION MODULE | mfp001 |
| PRINT EXECUTION MODULE | mfp001 |
| COMPLETED PRINTING ALERT MODULE | mfp001 |

| 002 | PROVIDING MODEL |
|---|---|
| AUTHENTICATED PRINTING MANAGEMENT MODULE | mfp001 |
| ID READING MODULE | nwcard001 |
| ID AUTHENTICATION MODULE | mfp001 |
| PRINT DATA ACQUISITION MODULE | mfp001 |
| PRINT EXECUTION MODULE | mfp001 |
| COMPLETED PRINTING ALERT MODULE | mfp001 |

| NUMBER | MODEL NAME | CREATION DATE | SELECTION COUNT | CUMULATIVE UTILIZATION TIME |
|---|---|---|---|---|
| 001 | mfp001 | nwcard001 2007/08/08 | 7 | 10:30:15 |
| 002 | mfp001 | nwcard001 2007/06/12 | 4 | 3:30:21 |
| 003 | mfp002 | nwcard002 2007/08/08 | 0 | 00:00:00 |
| 004 | mfp003 | nwcard003 2007/08/08 | 2 | 00:10:30 |

710

FUNCTION-PROVIDING SYSTEM

CLAIM OF PRIORITY

The present application claims the priority based on Japanese Patent Application No. 2007-248972 filed on Sep. 26, 2007, the disclosures of which are hereby incorporated by reference in its entirety.

BACKGROUND

1. Technical Field

The present invention relates to a function-providing system that uses an information device and a peripheral device connected to the information device and providing added functions, to provide certain prescribed functionality.

2. Related Art

Various kinds of information devices, such as printers or multifunction devices that have multiple functions, e.g. printer and FAX functionality, are currently in use. Such information devices also implement various other functions, for example, duplex printing or (where an information device is shared by multiple users) user authentication. Such various functions are sometimes provided by a module appropriate to a particular model of information device and pre-loaded onto the information device; or provided on an optional device intended for connection to the information device. Examples of such optional devices are network cards and USB memory.

Since information devices come in a large number of different models and types with differing capabilities, such optional devices must be designed appropriately for different types of information devices, and this in turn means an increased number of kinds of optional devices that must be provided. To address this problem, there has been proposed, for example, a technology whereby modules for controlling optional device hardware and software are standardized, and when connected to an information device, optimal parameters for that particular information device will be set up in the optional device so that linked operation of the optional device and the information device can be achieved.

However, as the conventional technology exclusively utilizes the modules that control the optional device hardware, even if an optional device includes modules for providing the same function as an information device, it was difficult to select whether to use either the modules included in the optional device, or the modules included in the information device.

The above problem is not exclusive to multifunction devices and printers, but is common to other output devices such as projectors.

SUMMARY

With the foregoing in view, it is an object of the present invention to provide a function-providing system that includes an information device and an optional device connected to the information device, wherein modules selected from modules included in the information device and in the optional device can be flexibly combined to provide desired functions.

One aspect of the present invention provides a function-providing system, the function-providing system comprises an information device, an added function-providing device and a controller, wherein the added function-providing device is connected to the information device and providing an added function to the information device, and wherein the controller controls operation of the information device and of the added function-providing device, wherein the information device comprises: a first module memory that stores at least one module used to execute a prescribed function, wherein at least one module includes a first module; and a first module executor that executes the module stored in the first module memory; the added function-providing device comprises: a second module memory that stores at least one module used to execute the prescribed function, wherein at least one module includes a second module, wherein the second module is identical to the first module; and a second module executor that executes the module stored in the second module memory; and the controller comprises: a selecting module that selects, from among modules stored in the first module memory and the second module memory, at least one module for use in executing the prescribed function, the selecting module selects either the first module or the second module when the prescribed function includes a function executed by the first module and the second module; and control module that makes the first module executor or/and the second module executor execute a module selected by the selecting module.

According to the function-providing system of the aspect of the present invention, from identical modules held in memory in duplicate on the information device and on the added function-providing device, either module is able to be selected. Consequently, modules held in memory on both the information device and the added function-providing device are able to be flexibly combined to provide desired functionality.

These and other objects, features, aspects, and advantages of the invention will become more apparent from the following detailed description of the preferred embodiments with the accompanying drawings.

BRIEF DESCRIPTION OF THE DRAWINGS

FIGS. 4A and 4B show exemplary module lists in the first embodiment.

FIGS. 6A and 6B show exemplary module lists in the second embodiment.

FIGS. 9A and 9B show exemplary content of combination information in the third embodiment.

FIG. 10 shows exemplary management information for managing combination information in the third embodiment.

DESCRIPTION OF THE PREFERRED EMBODIMENT

Figure 1:
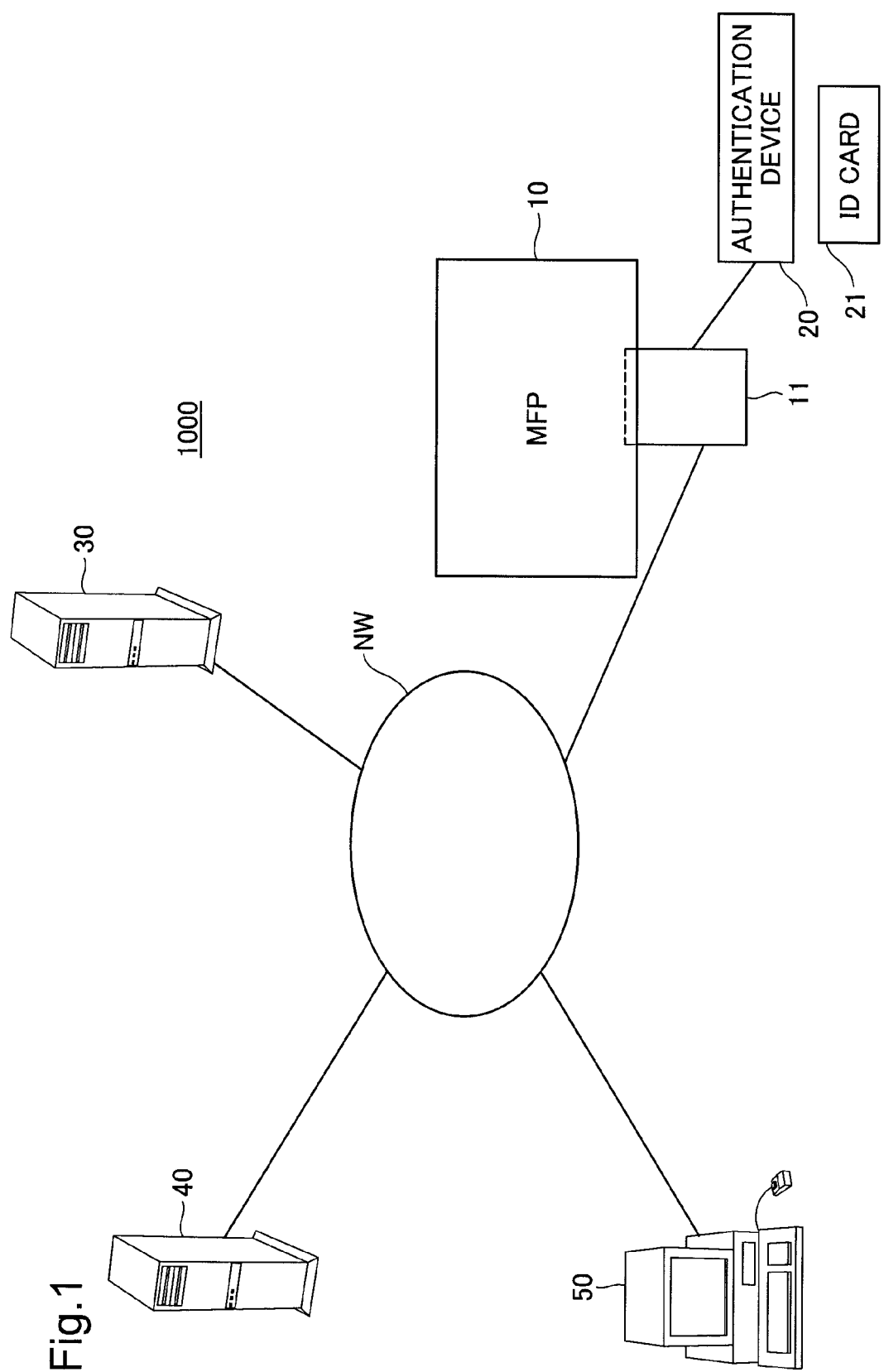
FIG. 1 shows an exemplary system configuration of an authenticated printing system in the first embodiment.

A. First Embodiment:

A1. System Configuration:

FIG. 1 shows an exemplary system configuration of an authenticated printing system in a first embodiment. Authenticated printing refers to a technology by which, when a highly confidential document is printed out, a hard copy is output only after verifying that the creator of the document being output or an authorized inspector is present in proximity to the printer, in order to avoid the hard copy of the printed document from becoming mixed up with other printouts and inadvertently falling into the wrong hands. This authenticated printing system 1000 includes a multifunction device 10; a network interface card 11 connected to the multifunction device 10; an authentication unit 20 connected to the network interface card 11; an ID card 21; an authenticated print server 30; a user authentication server 40; and a client computer 50. The multifunction device 10, the authenticated print server 30, the user authentication server 40, and the client computer 50 are connected on a network NW.

The multifunction device 10 is a device that provides multiple functions such as a print function, a fax function, and a copy function. The multifunction device 10 is also provided with some of the modules necessary for executing authenticated printing. Hereinbelow, in the first embodiment, the multifunction device 10 shall be referred to as MFP (Multifunction Peripheral 10.

The network interface card 11 includes a LAN interface for connection to the network NW, and a USB interface for connection to the authentication unit 20; the card 11 is installed in an option slot of the MFP 10. The MFP 10 connects to the network NW via the network interface card 11. The network interface card 11 also includes modules necessary for executing authenticated printing, some of which modules are not provided to the multifunction device, and some of which modules are duplicate modules (identical modules) provided to the multifunction device; the card 11 is connected to the MFP 10, and functions in cooperation with the MFP 10 to execute printing of authenticated print jobs.

The ID card 21 is an IC card of non-contact design having an on-board IC chip that stores user authentication information. The authentication unit 20 is an IC card reader having authentication medium reading module 25 that reads user authentication information from IC cards. The authenticated print server 30 is a print server that manages printing of print jobs for which authenticated printing is required. The user authentication server 40 is an authentication server that implements authentication of a user who uses the MFP 10.

The flow of the authenticated printing process in the authenticated printing system 1000 is now described. When the user issues a print command to print a print job with an appended user authentication request (hereinafter termed authenticated print job) from an application on the client computer 50, in response to the print command, the client computer 50 sends the authenticated print job to the authenticated print server 30. After issuing the print command, the user then proceeds to the location of the MFP 10 which is executing printing, and holds his or her ID card over the authentication unit 20.

Upon receiving the authenticated print job, the authenticated print server 30 sends to the MFP 10 a print request that includes a user authentication request. The MFP 10 and the network interface card 11 then cooperate to read the user authentication data from the ID card and transmit the user authentication data to the user authentication server 40. The user authentication server 40 then implements user authentications using the authentication information received from the authentication unit 20 via the network NW. Once the user has been authenticated, the MFP 10 and the network interface card 11 cooperate to output the authenticated print job.

Figure 2:
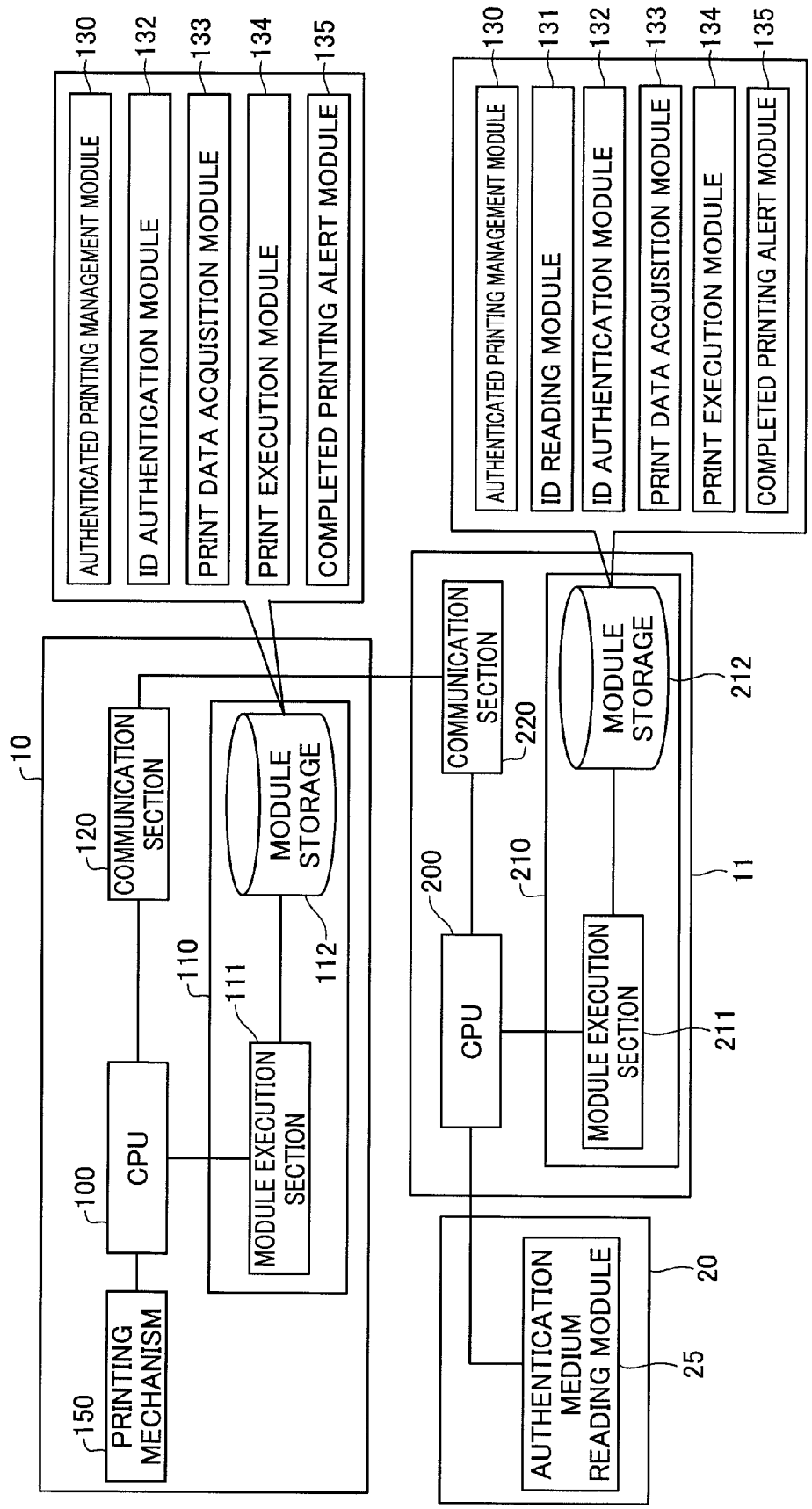
FIG. 2 shows exemplary function blocks of an MFP 10 and a network interface card in the first embodiment.

A2. Function Blocks:

The function blocks of the MFP 10 and the network interface card 11 are described with reference to FIG. 2. FIG. 2 shows exemplary function blocks of the MFP 10 and the network interface card 11 in the first embodiment. While not depicted in the drawings hereinbelow, the MFP 10 also includes blocks that provide a fax function and a copy function.

The MFP 10 includes a CPU 100, a memory 110, a communication section 120, and a printing mechanism 150. The CPU 100 controls the function blocks. The memory 110 includes a module execution section 111 and a module storage 112. The module execution section 111 executes the modules that are stored in the module storage 112. In the module storage 112, the modules are stored together with a list of the modules stored in the module storage 112.

In the module storage 112 are stored an authenticated printing management module 130, an ID authentication module 132, a print data acquisition module 133, a print execution module 134, and a completed printing alert module 135.

The network interface card 11 includes a CPU 200, a memory 210, and a communication section 220. The memory 210 includes a module execution section 211 and a module storage 212. The CPU 200 controls the function blocks. The module execution section 211 executes the modules that are stored in the module storage 212. In the module storage 212, the modules are stored together with a list of the modules stored in the module storage 212.

In the module storage 112 are stored an authenticated printing management module 130, an ID reading module 131, an ID authentication module 132, a print data acquisition module 133, a print execution module 134, and a completed printing alert module 135.

As noted, modules belonging to the devices are executed by the module execution section of the device that has the respective modules. Specifically, the modules that are stored in the module storage 112 are executed by the module execution section 111 of the MFP 10, while the modules that are stored in the module storage 212 are executed by the module execution section 211 of the network interface card 11.

Execution of authenticated printing in the first embodiment requires the authenticated printing management module 130, the ID reading module 131, the ID authentication module 132, the print data acquisition module 133, the print execution module 134, and the completed printing alert module 135. In the MFP 10 and the network interface card 11, a module stored on only one or the other of the devices is executed by the device on which it is stored; whereas for duplicate modules held by both, either one of the modules is selected according to a predetermined selection hierarchy, and executed by the device in which the selected module is present. The module execution devices, the module execution command, and so on are controlled by the authenticated printing management module 130. The authenticated printing management module 130 corresponds to the "control unit" taught in the claims.

Figure 3:
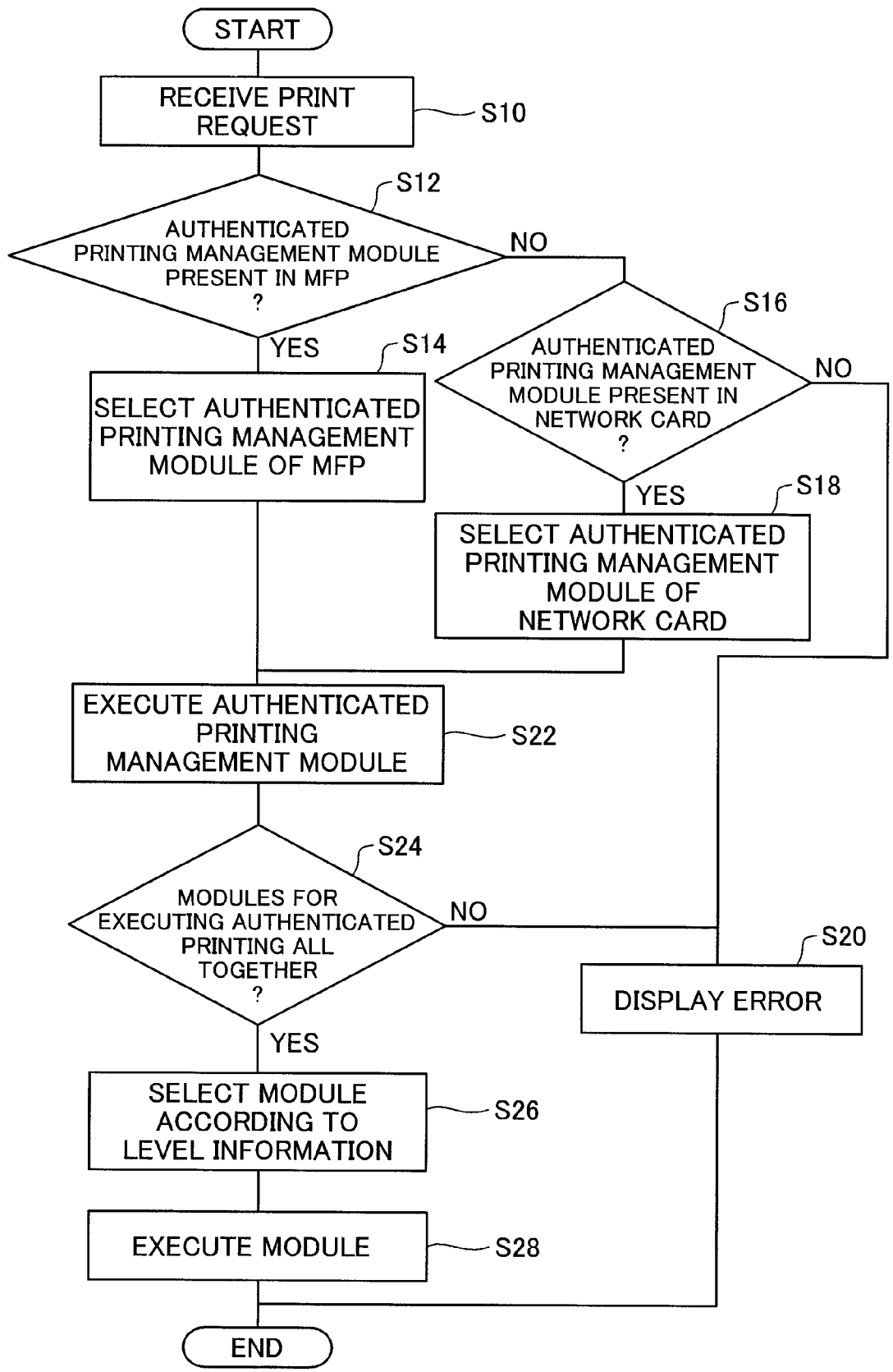
FIG. 3 is a flowchart illustrating an authenticated printing process in the first embodiment.

A3. Process Flow:

FIG. 3 is a flowchart illustrating the authenticated printing process in the first embodiment. When the CPU 100 of the MFP 10 receives from the authenticated print server 30 a print request for an authenticated print job (Step S10), CPU 100 decides whether the authenticated printing management module 130 is stored in the module storage 112 of the MFP 10 (Step S12). If found that the authenticated printing management module 130 is stored in the module storage 112 (Step S12: YES), the authenticated printing management module 130 of the module storage 112 is selected (Step S14). Meanwhile, if found that the authenticated printing management module 130 is not stored in the module storage 112 (Step S12: NO), the CPU 100 then decides whether the authenticated printing management module 130 is stored in the module storage 212 of the network interface card 11 (Step S16). If found that the authenticated printing management module 130 is stored in the module storage 212 of the network interface card 11 (Step S16: YES), the CPU 100 selects the authenticated printing management module 130 of the module storage 212. (Step S18). If found that the authenticated printing management module 130 is not stored in the module storage 212 (Step S16: NO), the CPU 100 displays on the control display of the MFP 10 an error message to the effect that authenticated printing is not able to be implemented.

Selection of the authenticated printing management module 13 will be described in detail with reference to FIG. 4A, 4B. FIG. 4A shows a module list representing the modules stored in the module storage 112 of the MFP 10. FIG. 4B shows a module list representing the modules stored in the module storage 212 of the network interface card 11. The module list 600 is stored in the module storage 112 together with the modules, while the module list 610 is stored in the module storage 212 together with the modules. The module lists 600, 610 show the names of the modules required for authenticated printing, and whether the modules are present or absent. In the module lists 600, 610, modules that are stored in each respective module storage are shown checked with a "X" in the field to the left of the module name. As shown in FIG. 4A, of the modules necessary to provided authenticated printing, all of the modules except for the ID reading module 131 are stored in the module storage 112 of the MFP 10. As shown in FIG. 4B, of the modules necessary to provided authenticated printing, all of the modules, including the ID reading module 131, is stored in the module storage 212 of the network interface card 11.

The CPU 100 of the MFP 10 looks up in its own module list 600 to decide whether the authenticated printing management module 130 is stored in the module storage 112, and if stored there, selects the authenticated printing management module 130 of the MFP 10. If not stored there, CPU 100 looks up in the module list 610 and decides whether the authenticated printing management module 130 is stored in the module storage 212, and if stored there, CPU 100 then selects the authenticated printing management module 130 of the network interface card 11.

The CPU 100 then instructs the module execution section to execute the selected authenticated printing management module 130 (Step S22). In the first embodiment, since the authenticated printing management module 130 is stored in the module storage 112, the CPU 100 instructs the module execution section 111 of the MFP 10 to execute the authenticated printing management module 130 stored in the module storage 112. The module execution section 111 then initiates execution of the authenticated printing management module 130 in response to the execution instruction.

The authenticated printing management module 130 of the MFP 10 looks up in the module lists 600, 610 to decide whether all of the modules necessary for execution of authenticated printing are included within a module group that combines the modules that are stored in the MFP 10 and in the network interface card 11, i.e., whether the modules necessary for execution of authenticated printing are all together (Step S24). If the modules necessary for execution of authenticated printing are all together (Step S24: YES), the authenticated printing management module 130 of the MFP 10 then selects modules to be used from among the modules stored in the module storage 112 of the MFP 10 and the modules stored in the module storage 212 of the network interface card 11, this selection being made according to level information representing a prescribed selection hierarchy (Step S26). In the first embodiment, the selection hierarchy has been set up in advance by the administrator of the authenticated printing system 1000 on the basis of various kinds of information such a processing speed and processing load in the operational status of the MFP 10 and the network interface card 11, in such a way as to optimize operation of the authenticated printing system 1000. Alternatively, the authenticated printing management module 130 may set up the selection hierarchy appropriately with reference to the operational status of the MFP 10 etc. The selection hierarchy is preferably set up in such a way that modules considered optimal for providing the functions (in the first embodiment, authenticated printing) provided by the MFP 10 and the network interface card 11 are selected.

More specifically, the authenticated printing management module 130 looks up in the module lists 600, 610, and from among identical modules stored in both the module storage 112 and the module storage 212 select the modules associated with the higher level information. For example, as depicted in FIG. 4A, 4B, the ID authentication module 132 is stored in both the module storage 112 of the MFP 10 and the module storage 212 of the network interface card 11. Since the level information that represents the ID authentication module selection hierarchy is higher for the ID authentication module 132 stored in the module storage 212 of the network interface card 11, the authenticated printing management module 130 selects the ID authentication module 132 of the network interface card 11. Here, since no ID reading module 131 is stored in the module storage 112 of the MFP 10, the level information has been set to "0," so inevitably the ID reading module 131 that is stored in the module storage 212 of the network interface card 11 is selected. In the first embodiment, the authenticated printing management module 130 selects the ID reading module 131 and the ID authentication module 132 of the network interface card 11, as well as the print data acquisition module 133, the print execution module 134, and the completed printing alert module 135 of the MFP 10.

The authenticated printing management module 130 then instructs the module execution sections of the respective devices to execute the selected modules (Step S28).

Figure 5:
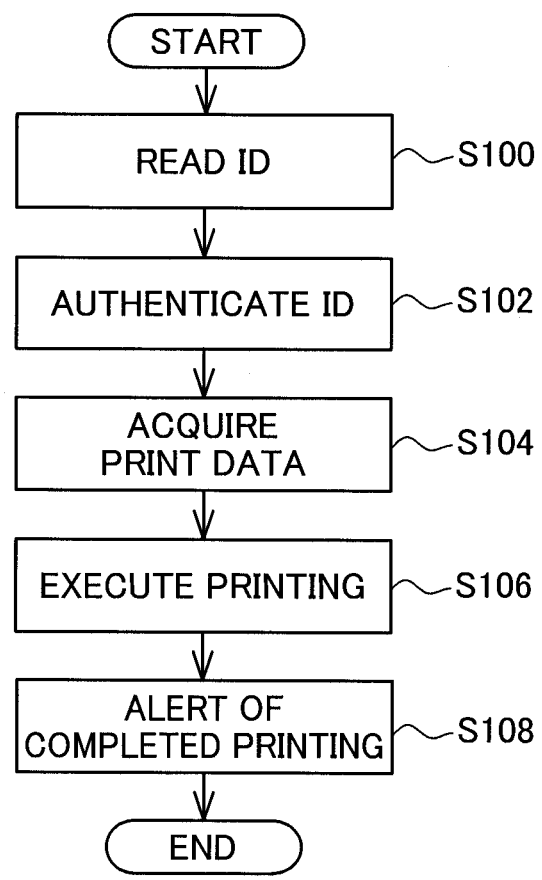
FIG. 5 is a flowchart illustrating a module execution process in the first embodiment.

FIG. 5 is a flowchart showing the execution process of the modules in the first embodiment. The authenticated printing management module 130 of the MFP 10 instructs the ID reading module 131 of the network interface card 11 to execute ID reading, whereupon the ID reading module 131 of the network interface card 11, via the authentication unit 20, acquires the authentication information that has been stored on the ID card 21 and transfer the information to the ID authentication module 132 of the network interface card 11 (Step S100). The ID authentication module 132 of the network interface card 11 then executes ID authentication (Step S102). Specifically, the ID authentication module 132 sends an authentication request that includes the authentication information to the user authentication server 40, receives an authentication result in response, and if the user is authenticated, alerts the authenticated printing management module 130 that user authentication has been completed.

Upon completion of user authentication, the authenticated printing management module 130 instructs the print data acquisition module 133 of the MFP 10 to execute reception of the authenticated print job, whereupon the print data acquisition module 133 of the MFP 10 acquires the authenticated print job which has been spooled on the authenticated print server 30 (Step S104). The authenticated printing management module 130 then instructs the print execution module 134 of the MFP 10 to execute the printing process of the acquired authenticated print job (Step S106), and then instruct the completed printing alert module 135 to alert the client computer 50 when printing is completed (Step S108).

According to the authenticated printing system of the first embodiment, even where the modules necessary for executing the authenticated printing function are included on both the MFP 10 and the network interface card 11, modules stored on either the MFP 10 or the network interface card 11 may be selected and utilized appropriately.

Moreover, according to the authenticated printing system of the first embodiment, the modules to be used are able to be selected from the MFP 10 and the network interface card 11 according to a selection hierarchy that has been predefined by the administrator depending on operational status of the MFP 10, so that modules appropriate for the operational status of the MFP 10 are able to be used, and so that improved processing efficiency and reduced processing load are able to be achieved.

B. Second Embodiment:

In the first embodiment, modules are selected according to a selection hierarchy. In Embodiment 2, modules are selected according to the processing load of each module in each device. The system configuration and function blocks of the second embodiment are analogous to those of the first embodiment. However, in the module storage 112 and the module storage 212, the module lists 600, 610 are replaced by module lists 620, 630 in which the selection hierarchy is replaced by the processing load of each module in each device.

B1. Load Information:

The module lists in the second embodiment are described with reference to FIG. 6A, 6B. FIG. 6A shows the module list 620 that represents the modules stored in the module storage 112 of the MFP 10. FIG. 6B shows the module list 630 that represents the modules stored in the module storage 212 of the network interface card 11. The module list 620 is stored together with the modules in the module storage 112, while the module list 630 is stored together with the modules in the module storage 212. The module lists 620, 630 show the names of the modules required for authenticated printing, and whether the modules are present or absent. In the module lists 620, 630, modules that are stored in each respective module storage are shown checked with a "X" in the field to the left of the module name. The module lists 620, 630 also include load information representing the extent of load on each device when each module is executed in each device. A higher numerical value for load information represents higher load.

The load information in the module list 620 is registered by the CPU 100 of the MFP 10. Similarly, the load information in the module list 630 is registered by the CPU 200 of the network interface card 11. Specifically, the CPU 100 determines the information based on the load (e.g. the CPU utilization) placed on the CPU 100 during execution of modules by the module execution section 111, and register this information in the module list 620. Similarly, the CPU 200 determines the information based on the load placed on the CPU 200 during execution of modules by the module execution section 211 and registers this information in the module list 630. The load information may be updated each time a module is executed, or updated at periodic intervals. The load information may also be predefined by the user. In this case, the information may be defined based on the capabilities and provided functions of the MFP 10 and the network interface card 11.

The authenticated printing management module 130 looks up in the module lists 620, 630, and where the load information for both of identical modules stored in the module storage 112 and the module storage 212 are equal to or less than a threshold value, preferentially selects the module that is stored on the module storage 112. On the other hand, if the load information for both of identical modules stored in the module storage 112 and the module storage 212 exceeds the threshold value, the module with the lower load information is selected. In the first embodiment, the threshold value for load information is "1.0." No values have been set for modules that are not stored.

For example, if as showed in FIG. 6A, 6B, the load information of the ID authentication module 132 of the MFP 10 is "1.0" and the load information of the ID authentication module 132 of the network interface card 11 is "0.0," since the load information of the ID authentication modules 132 of both the MFP 10 and network interface card 11 is equal to or less than the threshold value, the authenticated printing management module 130 preferentially selects the ID authentication module 132 of the MFP 10. On the other hand, if the load information of the completed printing alert module 135 of the MFP 10 is "2.0" and the load information of the completed printing alert module 135 of the network interface card 11 is "0.0," since the load information of the completed printing alert module 135 of the MFP 10 exceeds the threshold value while the completed printing alert module 135 of the network interface card 11 is equal to or less than the threshold value, the authenticated printing management module 130 selects the completed printing alert module 135 of the network interface card 11.

According to the authenticated printing system of the second embodiment described above, modules to be used are able to be selected using load information in each device during module execution. Consequently, modules are able to be executed in consideration of the processing load, and authenticated printing functionality with higher operational stability is able to be provided.

C. The Third Embodiment:

In the first embodiment and the second embodiment, modules for use are selected using module lists retained by the MFP 10 and the network interface card 11. In the third embodiment, a server connected to the network NW stores combination information that represents a combination of a module to be used and a device for executing the module; and the MFP 10 or network interface card 11 acquires this combination information over the network, and select a module according to the acquired combination information.

Figure 7:
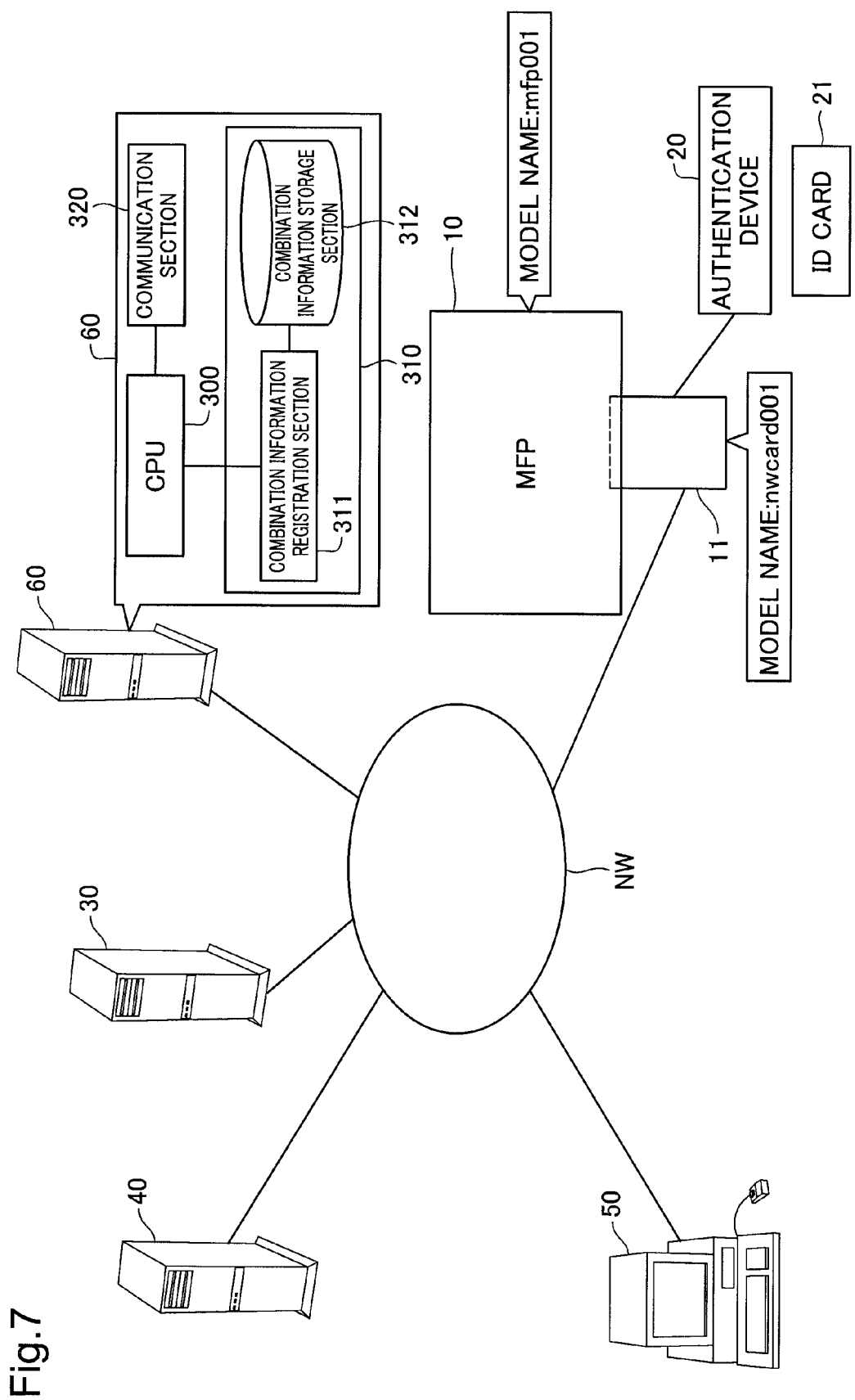
FIG. 7 shows an exemplary system configuration in the third embodiment.

C1. System Configuration:

FIG. 7 shows an exemplary system configuration in the third embodiment. In FIG. 7, a function block of a selection information management server is depicted together with the system configuration. The authenticated printing system 2000 of the third embodiment includes a multifunction device 10; a network interface card 11 connected to the multifunction device 10; an authentication unit 20 connected to the network interface card 11; an ID card 21; an authenticated print server 30; a user authentication server 40; a client computer 50; and a selection information management server 60; the multifunction device 10, the authenticated print server 30, the user authentication server 40, the client computer 50, and the selection information management server 60 are connected over a network NW. In the third embodiment, devices indicated by like symbols to the symbols in the first embodiment have function or action comparable to the first embodiment. As shown in FIG. 7, in the third embodiment the model of the MFP 10 is "mfp001" and the model of the network interface card 11 is "nwcard001."

The selection information management server 60 includes a CPU 300, a memory 310, and a communication section 320. The memory 310 includes a combination information storage section 312 and a combination information registration section 311. The combination information storage section 312 stores, in the form of a single record, combination information that represents a combination of modules necessary for providing authenticated printing functionality, and devices for executing the modules. Multiple records of different combinations of modules and devices are stored in the combination information storage section 312. The combination information registration section 311 registers, in the combination information storage section 312, the combination information that has been input by the administrator.

In the third embodiment, the MFP 10 having received a print request acquires, from the combination information stored on the selection information management server 60, combination information selected numerous times, i.e. having high frequency of usage. The MFP 10 and the network interface card 11 then execute the modules according to the acquired combination information.

Figure 8:
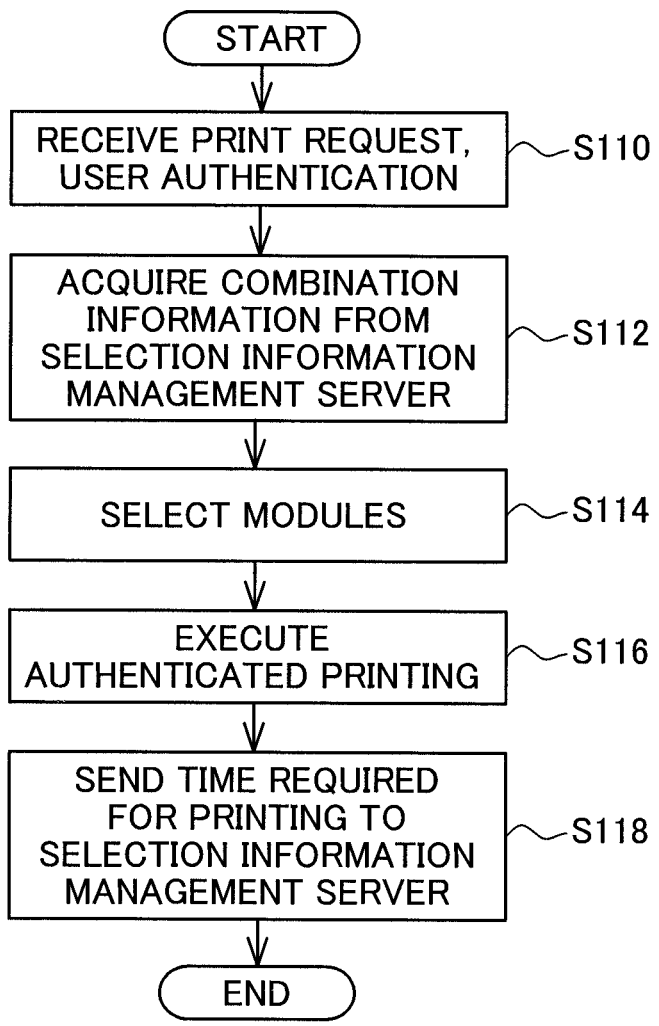
FIG. 8 is a flowchart illustrating a combination information selection process in the third embodiment.

C2. Process Flow:

FIG. 8 is a flowchart illustrating the combination information selection process in the third embodiment. The CPU 100 of the MFP 10 receives from the authenticated print server 30 a request to print an authenticated print job, implements user authentication (Step S110), and from among combination information appropriate to the models of the MFP 10 and the network interface card 11, acquires the combination information that was selected most often in the past (Step S112).

Selection of combination information is discussed with reference to FIG. 9A, FIG. 9B and FIG. 10. FIGS. 9A, 9B show exemplary content of combination information in the third embodiment. FIG. 10 shows exemplary management information for managing combination information in the third embodiment. The combination information shown in FIG. 9A and FIG. 9B respectively represent a single record. As shown in FIG. 9A, the record number of combination information 700a is "001." The combination information 700a includes the names of the modules necessary for providing authenticated printing, and model information that represents the model for providing the modules. For example, the combination information 700a shows that the ID reading module 131 is executed by the module execution section 211 of the network interface card 11, while the print data acquisition module 133 is executed by the module execution section 111 of the MFP 10. Also, as depicted in FIG. 9B, the combination information 700b which has a record number of "002" shows that the ID reading module 131 is executed by the module execution section 211 of the network interface card 11, while the other modules is executed by the module execution section 111 of the MFP 10.

The management information 710 of FIG. 10 includes the model names of the MFP and the network interface card suited to the combination information; the creation date of the combination information; a selection count indicating the number of times that the combination information was selected in the past; and a cumulative utilization time indicating the total duration of usage. For example, the management information 710 shows that the combination information of the record number 001 is suitable for a combination of devices having the model information "mfp001" and "nwcard001." The management information 710 also shows that the combination information of the record number 001 was generated on "Aug. 8, 2007" and was selected seven times in the past, and that the cumulative duration for which modules were executed by the combination represented by the combination information of the record number 001 is "10:30:15 (10 hours, 30 minutes, and 15 seconds)."

The CPU 100 of the MFP 10 looks up in the management information 710 and search for combination information suitable for the combination of models "mfp001" and "nwcard001," and from among the sets of combination information The CPU 100 finds, selects and acquires the combination information that was selected the most number of times.

In accordance with the acquired combination information, the CPU 100 selects modules (Step S114) and executes authenticated printing using these modules (Step S116). Specifically, the CPU 100 refers to the selected combination information and selects from the module storage 112 and the module storage 212 the modules that are to be used for authenticated printing. During this time, if the CPU 100 finds that execution of the authenticated printing management module 130 has been assigned to itself, it executes the authenticated printing management module 130 stored in its own module storage 112; or where execution of the authenticated printing management module 130 has been assigned to the network interface card 11, instructs the network interface card 11 to execute the authenticated printing management module 130 that is stored in the module storage 212. Subsequently, the authenticated printing management module 130 controls execution of the other modules. In the third embodiment, the authenticated printing management module 130 of the MFP 10 is selected.

Subsequent to the printing process, the authenticated printing management module 130 of the MFP 10 transmits the record number of the selected combination information, together with the time required for the authenticated printing process, to the selection information management server 60 (Step S118). Specifically, the time required for the authenticated printing process is measured by a timer (not shown) provided in the MFP 10, and this measurement is transmitted together with the record number of the selected combination information to the selection information management server 60.

The selection information management server 60 then reflects the received measurement in the management information 710. Specifically, the CPU 300 increment by "1" the selection count for the received record number in the management information 710, and add the received measured time to the cumulative duration of usage.

According to the authenticated printing system of the third embodiment described above, frequently used combinations of the modules are able to be used. Consequently, authenticated printing is able to be implemented with module combinations having high operational stability.

D. Modified Embodiments:

(1) While in the first embodiment, modules are selected based on level information, where for example duplicate modules are present in the MFP 10 and the network interface card 11, it would be possible to allow the user to decide which of the stored modules to use. In this case, a selection screen could be displayed on the control panel of the MFP 10, for example. This allows the use to use any desired modules.

(2) In the second embodiment, modules to be used are selected from among the modules stored on the module storage 112 and the module storage 212, based on whether the load information exceeds a threshold value; however, it would also be possible to simply select modules with low load information.

(3) In the third embodiment, the authenticated printing system administrator registers combination information from the selection information management server 60, but it would also be possible to register combination information from other devices, such as the MFP 10, the authenticated print server 30, and so on for example.

(4) In the third embodiment, the combination information that is to be used is selected based on the selection count of the combination information, but it would also be possible for example to select the combination information that is to be used based on the time that the combination information was generated, which is indicated in the management information 710 of FIG. 10. In this case, it is preferable for the authenticated printing system administrator to generate the combination information using module combinations considered optimal depending on operational status of the MFP 10. By so doing, authenticated printing is able to be provided by a module combination that is appropriate to the operation information of the MFP 10, and to improve processing efficiency while reducing processing load.

(5) In the third embodiment, the combination information to be used is selected based on the selection count of the combination information, but it would be possible for example to instead select the combination information having the longest cumulative duration of usage of the combination information. Since longer cumulative duration of usage is representative of stable operation, authenticated printing is able to be provided with module combinations having high operational stability thereby.

(6) In first embodiment to the third embodiment, an authenticated printing function is provided, but no limitation of the provided function to authenticated printing is intended thereby, and various other functions such as image output would be acceptable as well.

(7) While in the first embodiment to the third embodiment the authenticated printing system is described as being designed with a separate authenticated print server 30 and user authentication server 40, the separate authenticated print server 30 and user authentication server 40 could be constituted as a single server. Furthermore, the selection information management server 60, the authenticated print server 30, and the user authentication server 40 described in the third embodiment is able to be integrally constituted.

(8) While in the first embodiment to the third embodiment, an authenticated printing management module 130 is stored in the MFP 10 and in the network interface card 11, the authenticated printing management module 130 could instead by configured as a control unit for controlling execution of modules of the MFP 10 and the network interface card 11.1 In this case, the control unit is constituted as a separate unit from the MFP 10 and the network interface card 11.

(9) While in the first embodiment, the modules necessary for authenticated printing are provided by both the MFP 10 and the network interface card 11, it would also be acceptable for there to be an option device for providing added functions, in addition to the network interface card 11.

(10) While in the first embodiment, the MFP 10 is connected to the network NW via the network interface card 11, an arrangement whereby the MFP 10 is equipped with a separate network interface and is connectable to the network NW separately from the network interface card 11 would be acceptable, for example.

(11) While in the first embodiment to the third embodiment, print jobs are handed off between the client computer 50 and the MFP 10 via a server, the client computer 50 and the MFP 10 could instead have a local connection, for example.

(12) In the third embodiment, module combinations are selected based on combinations of model information of the MFP and the network interface card, but modules could also be selected based on the operating mode that has been set for the MFP, for example.

Although the present invention has been described and showed in detail, it is clearly understood that the same is by way of illustration and example only and is not to be taken by way of limitation, the spirit and scope of the present invention being limited only by the terms of the appended claims.

The invention claimed is:

1. A function-providing system comprising: an information device, an added function-providing device and a controller, wherein the added function-providing device is connected to the information device and providing an added function to the information device, and wherein the controller controls operation of the information device and of the added function-providing device, wherein the information device comprises:
a first module memory that stores at least one program module for executing a prescribed function, wherein at least one program module includes a first program module; and
a first module executor that executes the program module stored in the first module memory;
the added function-providing device comprises:
a second module memory that stores at least one program module for executing the prescribed function, wherein at least one program module includes a second program module, wherein the second program module is identical to the first program module; and
a second module executor that executes the program module stored in the second module memory; and
the controller comprises:
a selecting module that selects, from among program modules stored in the first module memory and the second module memory, at least one program module for executing the prescribed function, the selecting module selects either the first program module or the second program module when the prescribed function includes a function executed by the first program module and the second program module; and
control module that makes the first module executor or/and the second module executor execute a program module selected by the selecting module, wherein
the first module memory additionally stores first level information representing a selection hierarchy of program modules stored in the first module memory;
the second module memory additionally stores second level information representing a selection hierarchy of program modules stored in the second module memory; and
the selecting module selects, from the first program module and the second program module, the program module highest in the selection hierarchy, according to the first level information and the second level information.

2. The function-providing system in accordance with claim 1 further comprising:
first acquiring module that acquires a first load information representing first processing load, wherein the first processing load is processing load when the first program module is executed; and
second acquiring module that acquires a second load information representing second processing load, wherein the second processing load is processing load when the second program module is executed;
the selecting module selects either the first program module or the second program module based on the first load information and the second load information.

3. The function-providing system in accordance with claim 2 wherein
the selecting module selects the second program module when the first processing load exceeds a prescribed threshold value.

4. The function-providing system in accordance with claim 2 wherein
the selecting module, on the basis of the first processing load and the second processing load, selects the program module with the lower processing load from the first program module and the second program module.

5. The function-providing system in accordance with claim 1 further comprising:
a server that includes storage for storing combination information, wherein the combination information relates to a combination of a program module necessary for executing the prescribed function, and the device that, of the information device and the added function-providing device, executes the program module necessary for executing the prescribed function;
the selecting module, using the combination information, selects a program module for executing the prescribed function, from the first program module and the second program module.

6. The function-providing system in accordance with claim 5 wherein
the storage prestores the combination information specified on the basis of operational information of the information device; and
the selecting module selects the program module to be used for executing the prescribed function according to the combination information that is stored in the storage.

7. The function-providing system in accordance with claim 5 wherein the server further comprises:
a generating module that generates multiple sets of combination information and that stores the combination information in the storage; and
the selecting module, from among the multiple sets of combination information stored in the storage, selects the combination information satisfying a prespecified selection condition, and selects the program module using the selected combination information.

8. The function-providing system in accordance with claim 7 wherein
the storage stores a selection count in association with each set of combination information, wherein the selection count represents number of times that the set of combination information was selected; and
the selection condition includes selection of the combination information for which the selection count is equal to or greater than a prescribed count, or the combination information having the highest selection count.

9. The function-providing system in accordance with claim 7 wherein
the generating module stores creation time of the combination information in association with each set of combination information; and
the selection condition includes selection of the combination information with the most recent creation time.

10. The function-providing system in accordance with claim 7 wherein
the controller further comprises:
a transmission module that transmits time information to the server with the combination represented by the selected combination information, wherein the time information relates to the time of use of the selected program module;
the storage stores a cumulative duration in association with the combination information, wherein the cumulative duration is cumulative time of the time of use represented by the time information; and
the selection information includes selection of the combination information having the longest cumulative duration.

11. The function-providing system in accordance with claim 1 wherein
the information device includes at least one of a multifunction device and a printer;
the added function-providing device includes a network card; and
the prescribed function includes authenticated printing whereby the decision as to whether to allow printing is made based on authentication of the user.

12. The function-providing system in accordance with claim 1 wherein
the controller is installed in at least one of the information device and the added function-providing device.

13. A method for providing functions in a function-providing system, wherein the function-providing system comprising an information device, an added function-providing device and a controller; the method comprises the steps of:
implemented by the information device,
specifying a function to be executed;
implemented by the controller,
selecting, from among program modules stored in the information device and the added function-providing device, at least one program module including either a first program module or a second program module for executing the specified function, wherein the first program module is stored in the information device, and wherein the second program module is stored in the added function-providing device;
instructing the information device to execute a program module stored in the information device from among the selected program module, and the added function-providing device to execute a program module stored in the added function-providing device from among the selected program module;
implemented by the in information device or/and the added function-providing device,
executing the selected program module, wherein
the selecting includes selecting, from the first program module and the second program module, the program module highest in selection hierarchy, according to first level information stored in the information device representing the selection hierarchy of program modules stored in the information device and second level information stored in the added function-providing device representing the selection hierarchy of program modules stored in the added function-providing device.

14. A computer program product for providing functions in a function-providing system, wherein the function-providing system comprising an information device, an added function-providing device and a controller; the computer program product comprising:
a non-transitory computer readable medium; and
a computer program stored in the computer readable medium,
the computer program comprises:
implemented by the in information device,
a first program of specifying a function to be executed;
implemented by the controller,
a second program of selecting, from among program modules stored in the information device and the added function-providing device, at least one program module including either a first program module or a second program module for executing the specified function, wherein the first program module is stored in the information device, and wherein the second program module is stored in the added function-providing device;

a third program of instructing the information device to execute a program module stored in the information device from among the selected program module, and the added function-providing device to execute a program module stored in the added function-providing device from among the selected program module;

implemented by the in information device or/and the added function-providing device, a fourth program of executing the selected program module, wherein the second program is a program for selecting, from the first program module and the second program module, the program module highest in selection hierarchy, according to first level information stored in the information device representing the selection hierarchy of program modules stored in the information device and second level information stored in the added function-providing device representing the selection hierarchy of program modules stored in the added function-providing device.

\* \* \* \* \*